United States Patent

Baranowski, Jr.

[15] 3,699,998

[45] Oct. 24, 1972

[54] CALIBRATED PRESSURE REGULATOR

[72] Inventor: Frank Baranowski, Jr., 7 Pine Street, Lynnfield Center, Mass. 01940

[22] Filed: Dec. 11, 1970

[21] Appl. No.: 97,107

[52] U.S. Cl. ............137/327, 137/315, 137/505.42, 251/297, 251/367

[51] Int. Cl. ...........................................F16k 31/365

[58] Field of Search........137/505.41, 505.42, 505.11, 137/505.37, 315, 327; 251/367, 297

[56] References Cited

UNITED STATES PATENTS

| | | | |
|---|---|---|---|
| 2,819,728 | 1/1958 | Gage | 137/505.11 X |
| 1,244,226 | 10/1917 | Metzger | 137/505.37 X |
| 763,162 | 6/1904 | Curran | 137/505.42 |
| 3,516,442 | 6/1970 | Munroe | 251/367 X |
| 3,134,405 | 5/1964 | White | 251/297 X |
| 3,286,726 | 11/1966 | Guy | 137/505.42 X |
| 2,918,081 | 12/1959 | Laver | 137/505.42 X |

FOREIGN PATENTS OR APPLICATIONS

1,058,401  11/1953  France...........137/505.42

*Primary Examiner*—Harold W. Weakley
*Attorney*—James E. Mrose

[57] ABSTRACT

A miniaturized pressure regulator capable of being calibrated and thus making it possible to dispense with an additional pressure gauge, if desired. The components of the pressure regulator are maintained in position by leaf spring fasteners making it possible to quickly assemble and disassemble the pressure regulator.

6 Claims, 6 Drawing Figures

PATENTED OCT 24 1972

Inventor:
Frank Baranowski, Jr.
by
Attorney

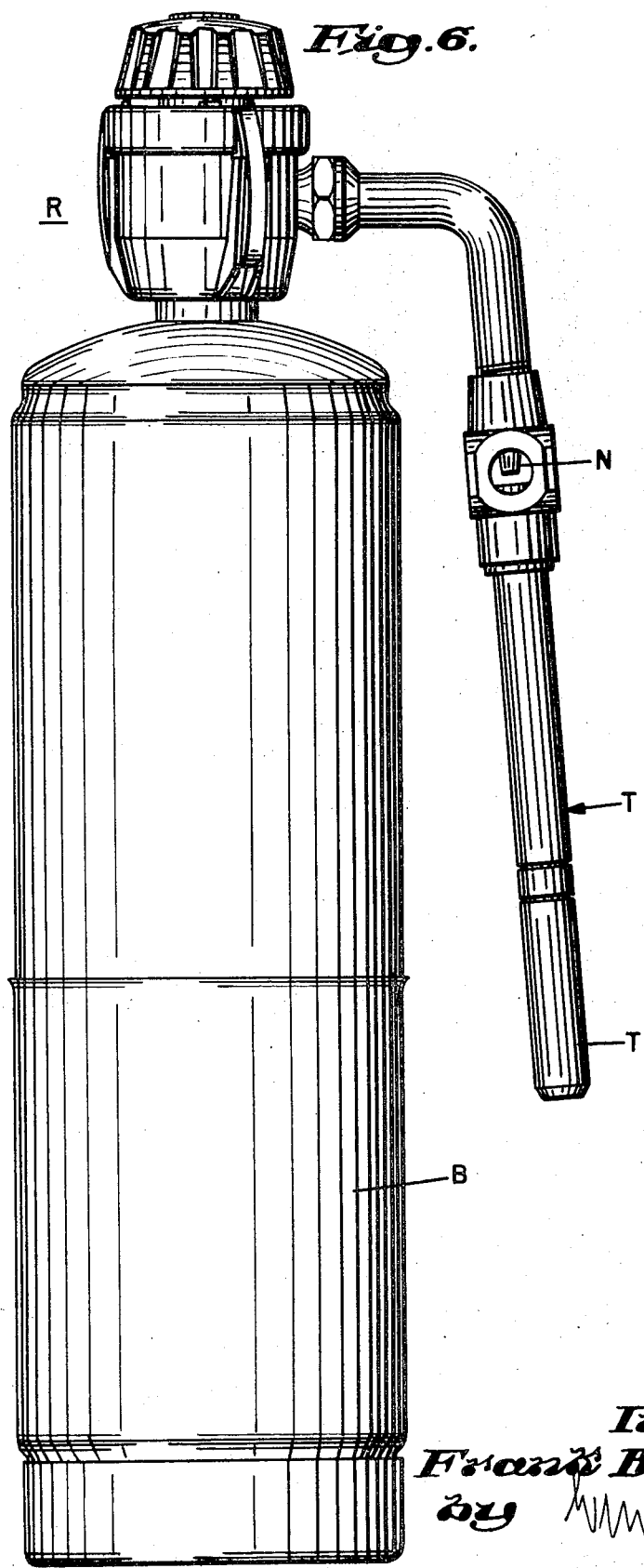

CALIBRATED PRESSURE REGULATOR

BACKGROUND OF INVENTION

Pressure regulators are generally provided with a pressure gauge to make it possible to determine the pressure prevailing at the outlet passageway thereof. This greatly increases the cost and the bulk of pressure regulators. The invention refers to a pressure regulator which is capable of being calibrated, thus dispensing with the need of providing the pressure regulator with an additional pressure gauge. Deletion of the additional gauge greatly decreases the cost and bulk of the pressure regulator. The added calibrating means are compact as well as inexpensive.

SUMMARY OF INVENTION

A pressure regulator embodying this invention includes a regulator body defining an inlet passageway, an outlet passageway and a valve seat passageway interconnecting said inlet passageway and said outlet passageway. A movable valve element cooperates with the valve seat formed by said valve seat passageway. Said valve element is biased by a spring to the closed position thereof. A diaphragm operating said valve element is arranged to be acted upon on the side thereof adjacent said valve element by fluid pressure prevailing downstream of said valve element. A calibrating spring engages, and rests with one end thereof against, the side of said diaphragm remote from said valve element. A manually operable screw-threaded pressure control member is arranged in coaxial relation to said valve element and has an abutment surface engaged by the other end of said calibrating spring. A pressure regulator embodying this invention further includes a calibrating member having a screw thread cooperating with the screw thread on said pressure control member and pivotable about the joint axis of the screw thread of said pressure control member and said screw thread of said calibrating member. This makes it possible to vary the compression of said calibrating spring without pivotal motion of said pressure control member relative to said regulator body.

BRIEF DESCRIPTION OF DRAWINGS

FIG. 6 shows a novel torch for soldering, brazing and like operations based on the use of a pressure regulator as shown in FIGS. 1–5.

DESCRIPTION OF PREFERRED EMBODIMENT

Figure 1:
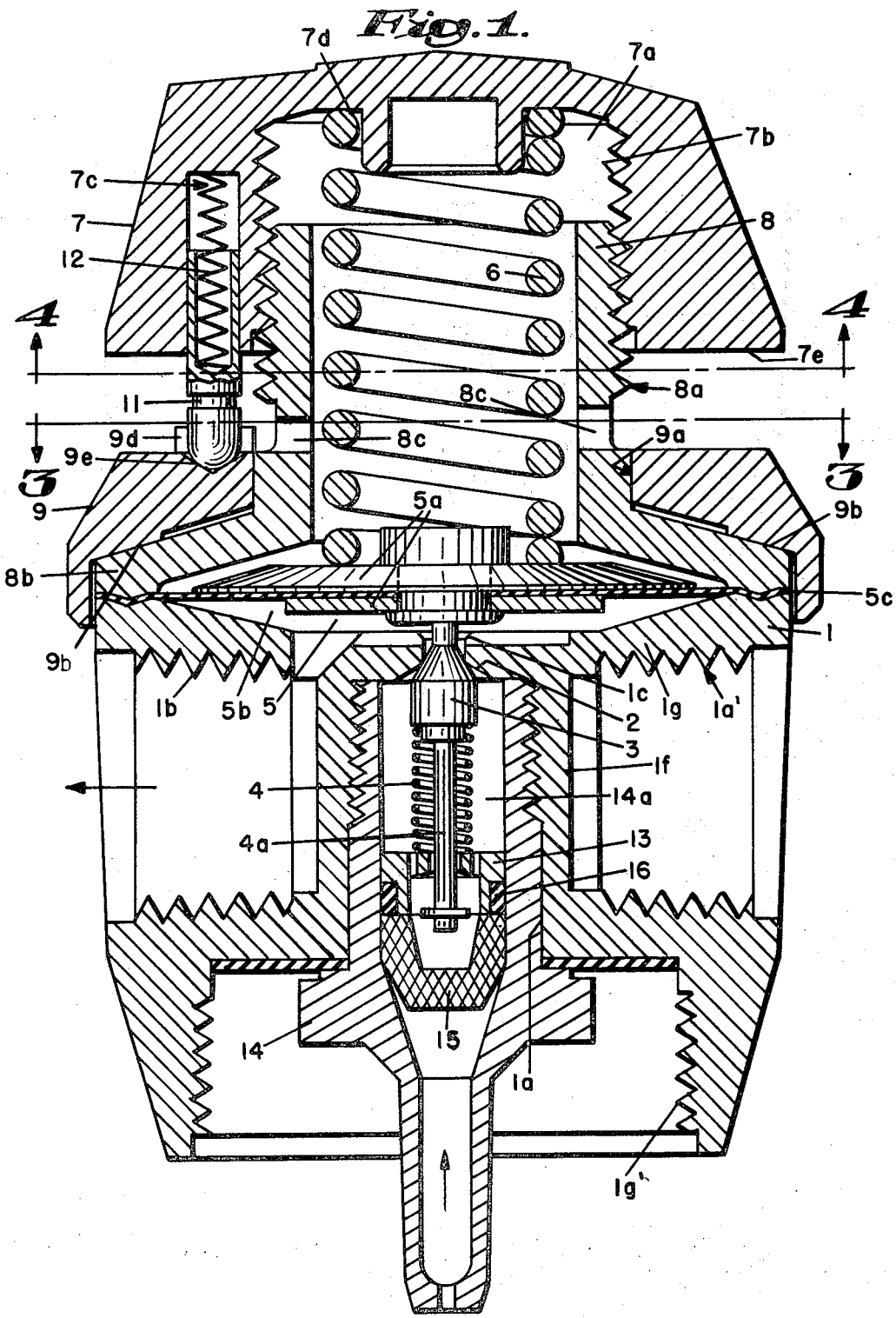
FIG. 1 is a vertical section of a regulator embodying this invention taken along 1—1 of FIG. 2.

In ths drawings reference numeral 1 has been applied to indicate a regulator body defining a screw-threaded inlet passageway 1a, a screw-threaded outlet passageway 1b and a valve seat passageway 1c interconnecting the inlet passageway 1a with the outlet passageway 1b. Passageway 1c forms the valve seat 2. Movable valve element 3 cooperates with valve seat 2 and is biased to the closed position thereof by the helical valve-element-biasing spring 4. The upper portion of regulator body 1 has a recess forming a diaphragm chamber 5b receiving a diaphragm generally indicated by numeral 5. The latter includes a circular disc 5c of an elastomer, e.g., rubber, which engages a conforming circular rim of the regulator body 1 and a pair of circular metal discs 5a sandwichung the center portion of disc 5c. Diaphragm 5 is subjected at the lower surface thereof, i.e., the side thereof adjacent valve element 3, to the pressure of fluid prevailing at the region downstream of valve element 3. The lower end of helical calibrating spring 6 engages, and rests against, the upper surface of diaphragm 5, or the side thereof remote from valve element 3. The upper end of spring 6 engages and abuts against the manually operable pressure control member, or pressure control knob 7. The outer surface of regulator body 1 is substantially in the shape of a solid of revolution, and valve element 2, helical springs 4 and 6, diaphragm 5 and pressure control knob 7 are arranged in coaxial relation to the outer surface of regulator body 1. Pressure control knob 7 is provided with a coaxial cavity 7a which is internally screw-threaded as indicated at 7b. The top of cavity 7a forms an abutment 7d engaging helical calibrating spring 6. Pressure control knob 7 is further provided with an axial eccentric bore 7c, i.e., a bore extending parallel to the axis of pressure control knob 7, but in radially spaced relation from the axis of pressure control knob 7. Reference numeral 8 has been applied to indicate a tubular calibrating member having an external screw thread 8a cooperating with, or engaging, the internal screw thread 7b of pressure control knob 7. Calibrating member 8 is pivotable both in clockwise and in counterclockwise direction about the joint axis of screw threads 7b and 8a to vary the compression of calibrating spring 6 without pivotal motion of pressure control knob 7 relative to regulator body 1. How such a pivotal motion of calibrating member 8 relative to regulator body 1 can best be achieved will be set forth below more in detail.

The calibrating member 8 includes a lower outwardly flaring flange portion 8b which has a larger diameter than the diameter of the screw-threaded portion of calibrating member 8. The large diameter of that flange portion is substantially equal to the diameter of the diaphragm 5, and the latter is sandwiched between the upper rim of regulator body 1 and the flange portion 8b of calibrating member 8. The cylindrical screw-threaded small diameter portion of the calibrating member 8 is provided with one or more tool-receiving recesses or radially extending bores 8c. By insertion of an appropriate tool into recesses or bores 8c the calibrating member 8 may be pivoted about the joint axis of the same and of parts 1,3,4,5,6 and 7 without effecting a pivotal motion of pressure control knob 7 relative to regulator body 1. A pivotal motion of calibrating member 8 without concomitant pivotal motion of pressure control knob 7 results in raising, or lowering of the latter, as the case may be, and in allowing calibrating spring 6 to expand, or in a compression of the latter.

Reference character 9 has been applied to indicate a substantially annular clamping member having a circular aperture 9a and a substantially circular abutment surface 9b having a larger diameter than said circular aperture 9a. The screw-threaded portion of relatively small diameter of calibrating member 8 projects through aperture 9a. The abutment surface 9b of clamping member 9 engages the relatively large diameter flange portion 8b of calibrating member 8 and clamps portion 8b of calibrating member 8 against diaphragm 5 and regulator body 1.

The structure further includes a plurality — preferably three — generally C-shaped clamping leaf springs 10 (FIGS. 2, 3 and 5) angularly displaced in regard to the joint axis of parts 1,2,3,4,5,6,7 and 8. Each leaf spring 10 engages with one end thereof one of a plurality of spring-receiving recesses 9c in clamping member 9. The axial bore 7c in pressure control knob 7 is provided with an index pin 11 biased in axial direction by a pin-biasing helical spring 12. Clamping member 9 has an upstanding ridge-like projection 9d for engaging pin 11 and thereby defining limit positions for pressure control knob 7. In other words, the upstanding ridge-like projection 9d of clamping member 9 and the pin 11 jointly movable with pressure control knob 7 are cooperating limit-position-establishing abutment means. One of these limit positions would normally mean that the passage defined by valve element 3 and valve seat 2 is open to such an extent that a predetermined constant pressure prevails in the outlet passageway b of valve body 1. In the other of these limit positions calibrating spring 6 is compressed to such an extent as to preclude passage of any fluid from inlet passageway 1a to outlet passageway 1b.

Each clamping leaf spring 10 has a substantially S-shaped end 10a engaging a cooperating clamping cam surface 9f and a recess 9c in clamping member 9. The other end 10b of each leaf spring 10 is substantially hook-shaped, or U-shaped, and engages a substantially conforming spring-end-receiving recess 1d of regulator body 1 which is closed by a ridge 1e. The hook-shaped, or U-shaped ends 10b of clamping spring 10 are relatively stiff, or have a relatively small mechanical compliance, while the S-shaped ends 10a of clamping springs 10 are relatively flexible, or have a relatively large mechanical compliance. The ridges 1e in regulator body 1 closing recesses 1d have a radius of curvature which is, at least in part, equal to the radius of curvature of the hook-shaped, or U-shaped ends 10b of leaf springs 10. Clamping member 9 is also a cover means. Its spring-receiving recesses 9c are each closed by a ridge 9f having a smaller radius of curvature than the radius curvature of the bend of the S-shaped end 10a of each spring 10 remote from valve body 1. This configuration of springs 10 and of the portions of parts 1 and 9 engaged by springs 10 makes it possible to combine a firm clamping action by springs 10 on parts 1 and 9, resulting in stressing of springs 10 in a direction longitudinally thereof, with the possibility of ready assembly and disassembly of the pressure regulator due to the large mechanical compliance of the S-shaped ends 10a of springs 10 and the cam action of the ridges 9f closing recesses 9c tending to expand springs 10 when the latter are inserted into, or removed from, parts 1 and 9.

The lower end surface 7e of pressure control knob 7, i.e., the end surface of knob 7 adjacent regulator body 1, has a diameter considerably larger than the major diameter of screw-thread 7b, and the major diameter of screw-thread 8a. The diameter of end surface 7e of knob 7 is substantially equal to, or but slightly smaller than, the diameters of regulator body and clamping member 9 at the side thereof adjacent control knob 7 whereby a region of limited accessibility if established adjacent the end surface 7e of knob 7. The tool-receiving recesses 8c in calibrating member 8 are situated in the aforementioned region of limited accessibility. This is desired in order to preclude accidental changes in the calibration of the regulator which would be caused by an unintentional pivotal motion of calibrating member 8 relative to regulator body 1. The fact that tool-receiving recesses 8c are not exposed to view from the front of the regulator, and are arranged in a region of limited accessibility, tends to preclude tampering with the calibration of the regulator by incompetent personnel. Only one who knows the hidden place of calibration control, and has the right tool fitting into recesses 8c, will be in a position to change the calibration of the pressure regulator whenever necessary, or desirable. In many instances a regulator once having been calibrated to maintain a certain pressure at the outlet passageway 1b thereof does not need to be recalibrated.

Clamping member 9 is provided on the end surface thereof adjacent pressure control knob 7 with a plurality of indexing recesses 9e (FIG. 3) arranged in a circular pattern conforming with the circular trajectory of index pin 11 resulting from pivotal motions of knob 7 about the axis thereof. Index pin 11 is provided on the end thereof which projects axially outwardly beyond end surface 7c of knob 7 with a substantially hemispherical tip which engages the indexing recesses 9e in clamping member 9 when knob 7 is pivoted relative to clamping member 9 and regulator body 1.

As clearly shown in FIG. 1 the valve-element-biasing spring 4 has an upper end engaging valve element 3 and a lower end engaging a washerlike abutment member 13 provided with apertures for the passage of gas under pressure from a tank filled with gas under pressure to valve seat passageway 1c. The inlet passageway 1a is provided with an insert 14 screwed into valve body 1 and forming a valve chamber 14a. The latter houses a filter 15 and an O-ring 16 is interposed between filter 15 and abutment member 13.

In the structure of FIG. 1 the gas admitted through the insert 14 of inlet passageway 1a and discharged through outlet passageway 1b has substantially a right angle flow pattern as indicated by two arrows of which one indicates the direction of flow of fluid into the pressure regulator, and the other indicates the direction of the flow of fluid out of the pressure regulator. It is apparent from FIG. 1 that the direction of the flow into the pressure regulator is substantially axial and the direction of flow out of the pressure regulator is substantially radial. In some instances it is desirable to admit fluid to the pressure regulator in a radial direction and to withdraw fluid from the pressure regulator also in radial direction. For this reason it is desirable to design a pressure regulator in such a way that it can readily be modified to allow admission of gas to it in a radial direction. How this can be achieved will be shown below more in detail.

The structure as described above is capable of being calibrated, i.e., adjusted in such a way that each position of knob 7 corresponds to a predetermined pressure so as to dispense with a pressure gauge. In some instances it is, however, desirable to provide the pressure regulator with a pressure gauge in order to make it possible to check its calibration from time to time. How this can be achieved will likewise be set forth below more in detail.

Figure 2:
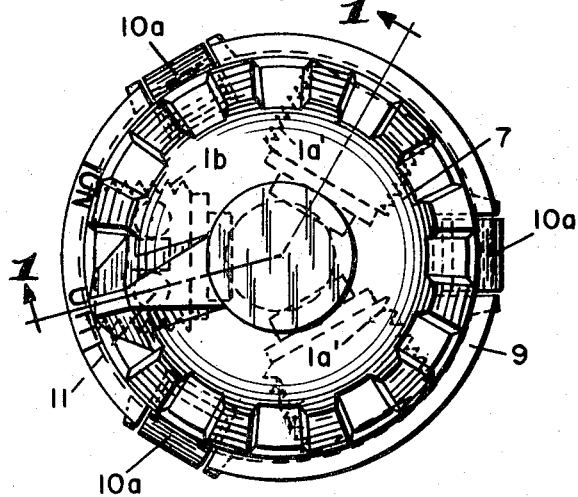
FIG. 2 is a top plan view of the regulator shown in FIG. 1.

As shown in FIG. 2 regulator body 1 defines, in addition to the outlet passageway 1b, a pair of internally screw-threaded recesses 1a'. One of these recesses 1a' is also shown in FIG. 1. The median planes of outlet passageway 1b and of recesses 1a' enclose angles of 120°. Normally recesses 1a' do not communicate with diaphragm chamber 5b. The upper wall of one or both recesses 1a' may be pierced so that the particular recess 1a' then communicates with diaphragm chamber 5b. Assuming that but one of screw-threaded recesses 1a' communicates with diaphragm chamber 5b, then the same pressure prevails in that recess 1a' as in the outlet passageway 1b. Hence a pressure gauge screwed into the particular recess communicating with diaphragm chamber 5b will indicate the pressure prevailing in diaphragm chamber 5 and may be used to calibrate the pressure regulator, and to check from time to time the calibration thereof.

If it is desired to admit gas radially rather than axially to the pressure regulator, insert 14 which defines an axial passage is replaced by an insert which defines a radial passage. This radial passage is extended into one of the screw-threaded recesses 1a' by providing an aperture in the partition 1f of regulator body 1. If this change is effected the radial recess 1a' becomes the inlet passageway of the pressure regulator. The internal screw-thread 1g' in the base portion of the regulator body 1 which is normally used to secure the pressure regulator to a gas tank may then be used to affix the pressure regulator to any support having a matching external screw-thread. The internal screw-thread in recess 1a' turned into an inlet passageway is then used to connect the pressure regulator to a supply of gas under pressure. When the pressure regulator is modified as indicated above a filter may be interposed between the recess 1a' which forms the inlet passageway and the valve chamber 14a.

If it is intended to use any one of the two recesses 1a' for connecting a pressure gauge to the pressure regulator, the partition 1g is pierced, so as to connect the diaphragm chamber 5b with the particular screw-threaded recess 1a to which it is intended to connect a pressure gauge.

The valve element 3 includes a portion which is substantially in the shape of a frustum of a cone and engages the valve seat 2, and a portion which is cylindrical and forms a shoulder against which the upper end of the biasing spring 4 of the valve element 3 rests. The valve stem 4a projects through valve element 3, and its upper end engages a boss integral with diaphragm 5. Valve element 3 is firmly affixed to valve stem 4a. The former is preferably of polytetrafluoroethylene for reasons more fully set forth in my copending patent application Ser. No. 97,276, filed Dec. 11, 1970 for FLUID FLOW CONTROL VALVE to which reference may be had for a preferred way of forming parts 3 and 4a.

Figure 4:
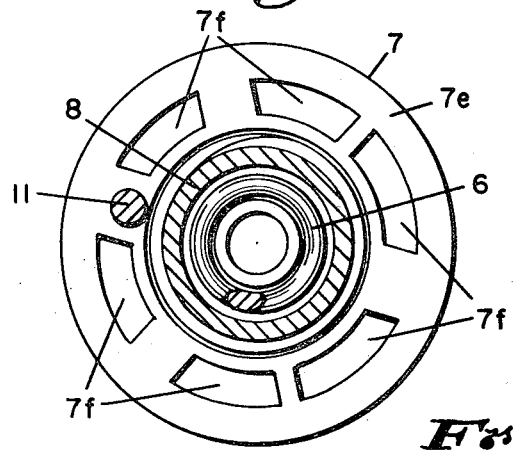
FIG. 4 is a section taken along 4—4 of FIG. 1.

Most parts of which the pressure regulator is made lend themselves to die casting. The pressure control member or knob 7 is preferably a die casting provided with six pocket-like recesses 7f to limit the mass and weight thereof (FIG. 4). Recesses 7f have open ends arranged in the plane defined by the end surface 7e of knob 7, and their opposite ends are closed. As clearly shown in FIG. 2 the sides of knob 7 are fluted to facilitate its manipulation.

Figure 3:
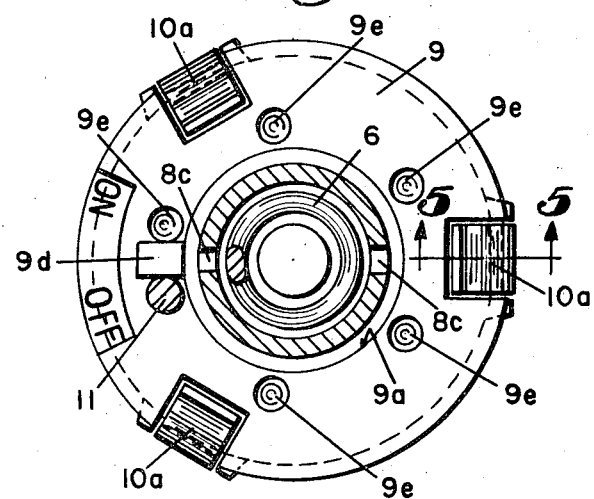
FIG. 3 is a section taken along 3—3 of FIG. 1.

Referring to FIG. 3, when index pin 11 abuts against the lower surface of abutment ridge 9d of clamping member 9 the valve 2,3 is fully closed by the action of helical biasing spring 4. Accordingly, this position of knob 7 is marked on the upper surface of clamping member 9 by an OFF sign. On the other hand, if knob 7 is rotated counterclockwise about 360° from the position shown in FIG. 3 until its index pin 11 abuts against the upper surface of abutment ridge 9d of clamping member 9, the valve 2,3 is as fully open as possible. Accordingly this position of knob 7 is marked on the upper surface of clamping member 9 by an ON sign. In this position the difference in fluid pressure prevailing in valve chamber 14a, on the one hand, and in outlet passageway 1b, on the other hand, is minimized. If it is desired to maintain a predetermined constant pressure in outlet passageway 1b the regulator may be adjusted in such a way that this pressure is maintained as long as index pin 11 abuts against the upper surface of abutment ridge 9d. Any other position of pin 11 and of knob 7 then results in a smaller pressure inside of outlet passageway 1b than the aforementioned predetermined constant pressure, and if knob 7 is rotated in clockwise direction (FIG. 3) until its pin 11 abuts against the lower surface of abutment ridge 9d, the pressure in outlet passageway 1b is zero. There is a one to one correspondence between each position of parts 7 and 11, and the pressure prevailing in outlet passageway 1b.

When it is intended to calibrate the pressure regulator, the intake passageway 1a and the valve chamber 14a are connected to a source of gas under pressure, e.g., a tank filled with propane gas, and the pressure prevailing downstream of the valve seat 2, e.g., in passageway 1b, is measured by means of a conventional pressure gauge. Prior to this operation the pressure control knob 7 has been turned to the fully open position, i.e., the position when one side of the index pin 11 abuts against one side of the upstanding ridge 9d of clamping member 9. Now an appropriate tool (not shown) is inserted in one of the tool-receiving recesses 8c of calibrating member 8, and the latter is pivoted about its own axis until the pressure gauge indicates the pressure intended to be associated with the fully open position of the regulator. Assuming that the pressure regulator is intended to be used for reducing the pressure of a gas stored in a tank at a relatively high pressure to 25 lbs/in.$^2$, which pressure is to be maintained constant, e.g., for the purpose of operating a torch, or a spray gun. Under such conditions the calibrating member 8 is adjusted or pivoted about its axis in such a way that the pressure gauge indicates the desired pressure at the outlet passageway 1b. Then the predetermined constant pressure of 25 lbs/in.$^2$ will always be established at the outlet passageway 1b by merely turning knob 7 to its initial calibrating position in which pin 7 engages the upper surface of ridge 9d (FIG. 3).

Assuming that the index or detent pin 11 of knob 7 is in engagement with one of the recesses 9e of clamping member 9 when the regulator is calibrated, as stated above, by means of a pressure gauge and by adjusting calibrating member 8. Then turning knob 7 to the very same position results always in the very same pressure in outlet passageway 1b. If knob 7 is not quite turned to that position, the pressure in passageway 1b will be less than, and if knob 7 is turned beyond that position, the pressure in passageway 1b will exceed, the pressure prevailing in passageway 1b with index or detent pin 11 in the aforementioned position. Since there is a one to one relation between the positions of pin 11 and the pressure prevailing in passageway 1b the upper surface of clamping member 9 may be calibrated in terms of various pressures prevailing in outlet passageway 1b, and since it is possible by adjusting calibrating member 8 to establish a desired pressure in outlet passageway 1b with knob 7 and pin 11 in any desired position, the upper surface of clamping member 9 may be provided with a scale for reading off pressures prevailing in outlet passageway 1b. This makes it possible to dispense with a pressure gauge though the proper adjustment of calibrating member 8 should be checked from time to time by means of a pressure gauge. The use of such gauge may, however, be limited to maintenance operations, i.e., called for in relatively long intervals of time.

Referring now to FIG. 6, reference character R has been applied therein to indicate a pressure regulator of the same character as shown in FIGS. 1 to 5, inclusive, and described in the context thereof. The pressure regulator R is mounted on top of a tank or bottle B filled with a combustible gas under pressure, e.g., propane. The blow torch T is pivotally connected to the outlet passageway of pressure regulator R, its axial inlet passageway being supplied with gas under pressure from tank or bottle B. Air for combustion is added to the fuel at the point or nozzle N, and the flame tube T' is provided with an internal system of helical vanes (not shown) for establishing a thorough mixture of fuel and air inside of flame tube T'. Blow torches of this description require for best performance maintenance of a critically constant gas pressure which is assured by the provision of the compact pressure regulator R on the top of tank or bottle B.

Figure 5:
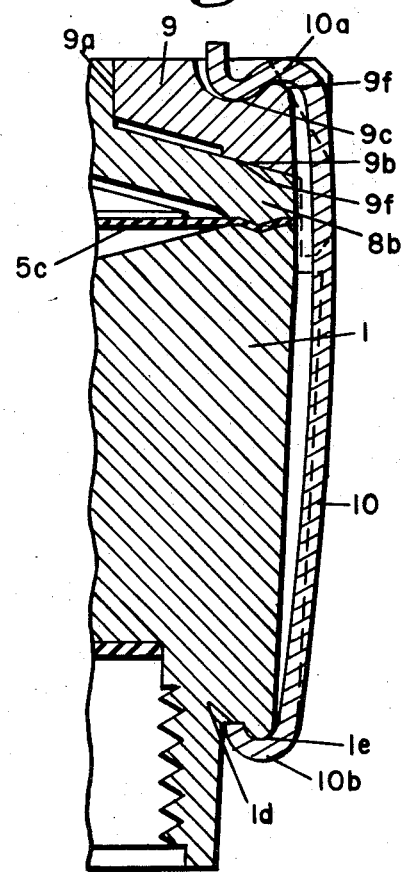
FIG. 5 is a section taken along 5—5 of FIG. 3.

In the structure of FIG. 6 the position of the flame tube T' and of the flame which issues from the latter are not dependent upon the position of the bottle or tank 3. Hence the flame can more readily be established wherever needed, particularly in close quarters where there is no access for the tank or bottle B. Assuming that it is desired to use a flame tube of the torch in a horizontal position to obtain a horizontal flame in relatively close quarters, this may be achieved either with the tank or bottle B in an erected position as shown in FIG. 5, or in a bottom up or inverted position with the pressure regulator R at a lower level than the tank or bottle B proper.

I claim as my invention:

1. A pressure regulator including
   a. a regulator body having an outer surface substantially in the shape of a solid of revolution, said regulator body defining an inlet passageway, an outlet passageway and a valve-seat-forming passageway interconnecting said inlet passageway and said outlet passageway;
   b. a movable valve element cooperating with the valve seat formed by said valve-seat-forming passageway to vary the effective area of said valve-seat-forming passageway;
   c. a first spring means biasing said valve element to the closed position thereof;
   d. a second spring means biasing said valve element to the open position thereof;
   e. a diaphragm interposed between said valve element and said second spring means and arranged to be acted upon by fluid pressure prevailing downstream from the location of said valve-seat;
   f. a pressure control knob arranged in coaxial relation to said regulator body, provided with a screw-thread and forming an abutment for the end of said second spring remote from said diaphragm;
   g. a calibrating member arranged in coaxial relation to said regulator body, supported by said regulator body, pivotable about the axis of said regulator body relative to said regulator body and having a screw-thread in cooperative engagement with said screw-thread on said pressure control knob, the pivotal motion of said calibrating member about the axis of said regulator body relative to said regulator body resulting in a change of the axial spacing of said pressure control knob from said regulator body without pivotal motion of said pressure control knob relative to said regulator body; and
   h. said knob having an end surface adjacent said regulator body which is of diameter considerably larger than the major diameter of said screw-thread of said pressure control knob and the major diameter of the screw-thread of said calibrating member and substantially equal to the diameter of the portion of said regulator body adjacent said control knob, whereby a region of limited accessibility is established adjacent said end surface of said control knob; and wherein
   i. the radially outer surface of said calibrating member is provided with a tool-receiving recess located in said region of limited accessibility.

2. A pressure regulator as specified in claim 1 wherein
   a. said calibrating member is provided with an outwardly flaring portion engaging the outer periphery of said diaphragm;
   b. an annular clamping member is arranged between said pressure control knob and said outwardly flaring portion of said calibrating member, said calibrating member extending axially through said annular clamping member and the outer periphery of said clamping member engaging the outer periphery of said outwardly flaring portion of said calibrating member; and wherein
   c. a plurality of leaf clamping springs engaging said regulator body and said clamping member with opposite ends thereof clamp said clamping member and said outwardly flaring portion of said calibrating member against the outer periphery of said diaphragm and against said valve body.

3. A pressure regulator as specified in claim 2 wherein
   a. said pressure control knob is provided with a bore extending parallel to the axis thereof and receiving a spring-biased index pin projecting beyond the end surface of said pressure control knob adjacent said regulator body and having a substantially hemispherical tip on the end thereof projecting beyond said end surface of said pressure control knob; and wherein b. the surface of said annular clamping member adjacent said end surface of said pressure control knob is provided with a plurality of indexing recesses arranged in a circular pattern conforming with the circular trajectory of said hemispherical tip of said index pin resulting from pivotal motions of said pressure control knob about said axis thereof.

4. A pressure regulator as specified in claim 3 wherein said surface of said annular clamping member is provided with an upstanding projection forming a pair of abutment surfaces for said index pin and limiting the freedom of pivotal motion of said pressure control knob about said axis thereof.

5. A pressure regulator as specified in claim 2 wherein each of said plurality of clamping springs has a substantially S-shaped end and a substantially hook-shaped end.

6. A valve structure including
a. a valve body having an outer surface substantially in the shape of a solid of revolution and defining an inlet passageway, an outlet passageway and a valve-seat-forming passageway connecting said inlet passageway to said outlet passageway, said valve body having on said outer surface thereof three recesses angularly displaced 120°;
b. a movable valve element inside said valve body cooperating with the valve seat formed by said valve-seat-forming passageway to vary the effective area of said valve-seat-forming passageway;
c. cover means arranged in coaxial relation to said valve body to close an opening in said valve body, said cover means having on the outer surface thereof three recesses angularly displaced 120° and each arranged in a common plane with the axis of said valve body and one of said three recesses on said outer surface of said valve body;
d. three generally C-shaped clamping leaf springs each engaging with one end thereof on of said three recesses in said outer surface of said valve body and each engaging with the other end thereof one of said three recesses in said cover means; and wherein
e. each of said three clamping leaf springs has a substantially S-shaped end and a substantially hook-shaped end; and wherein
f. said three recesses in said outer surface of said valve body and said three recesses in said cover means are shaped in such a fashion that each of said recesses receiving said substantially hook-shaped end of one of said clamping leaf springs is closed by ridge having at least in part a radius of curvature equal to the radius of curvature of the hook-shaped end of each of said clamping leaf springs, and that each of the recesses receiving said substantially S-shaped end of one of said clamping leaf springs is closed by a ridge having a smaller radius of curvature than the radius of curvature of the bend of said S-shaped end remote from said valve body.

* * * * *